(12) United States Patent
Hu et al.

(10) Patent No.: US 7,899,043 B2
(45) Date of Patent: Mar. 1, 2011

(54) ROUTE SERVICING DEVICE, METHOD AND SYSTEM APPLYING THE DEVICE

(75) Inventors: Xianli Hu, Shenzhen (CN); Rujun Li, Shenzhen (CN); Ning Cheng, Shenzhen (CN); Haipeng Li, Shenzhen (CN)

(73) Assignee: ZTE Corporation, Guangdong Province (CN)

( * ) Notice: Subject to any disclaimer, the term of this patent is extended or adjusted under 35 U.S.C. 154(b) by 760 days.

(21) Appl. No.: 10/582,980

(22) PCT Filed: Jun. 22, 2004

(86) PCT No.: PCT/CN2004/000665
§ 371 (c)(1),
(2), (4) Date: Jun. 15, 2006

(87) PCT Pub. No.: WO2005/064950
PCT Pub. Date: Jul. 14, 2005

(65) Prior Publication Data
US 2007/0115855 A1    May 24, 2007

(30) Foreign Application Priority Data
Dec. 25, 2003  (CN) ........................ 2003 1 0112905

(51) Int. Cl.
*H04L 12/28* (2006.01)
(52) U.S. Cl. ..................................................... 370/389
(58) Field of Classification Search .................. 370/250, 370/254, 255, 400, 409, 356, 389; 726/13, 726/27; 379/221.13
See application file for complete search history.

(56) References Cited

U.S. PATENT DOCUMENTS 5,485,455 A * 1/1996 Dobbins et al. ............. 370/255

(Continued)

FOREIGN PATENT DOCUMENTS

CN  1427591 A  7/2003

(Continued)

OTHER PUBLICATIONS

ISR of PCT/CN2004/000665, Aug. 26, 2004.

(Continued)

*Primary Examiner*—Man Phan
*Assistant Examiner*—Nourali Mansoury
(74) *Attorney, Agent, or Firm*—Kile Goekjian Reed & McManus PLLC (57) ABSTRACT

The present invention discloses a route service device and a method and a system for realizing call route by the device, in which, route service device and soft switch control device are networked in a layered way, the soft switch control device is the node of the lowest layer, when the user route changes, the soft switch control device reports route information including user node to the father node; the route service device performs registration, and broadcasts the changed route information to the father node, each related route service device performs registration and broadcast by the same way; when calling across domains, the soft switch control device where the calling locates initiates inquiry toward the father node, and receives the returned inquiring result, therefore routing the call to the soft switch control device where the called locates. The present invention employs route service device to replace soft switch control device for performing call route function, therefore enabling the soft switch control device absorbed in providing services, and also providing a scheme of large scale networking at telecommunication level for soft switch control device.

16 Claims, 3 Drawing Sheets

U.S. PATENT DOCUMENTS

| | | |
|---|---|---|
| 6,392,997 B1 | 5/2002 | Chen |
| 6,865,266 B1 * | 3/2005 | Pershan .................. 379/221.13 |
| 2004/0022237 A1 * | 2/2004 | Elliott et al. ................. 370/356 |
| 2004/0071131 A1 * | 4/2004 | Iyer et al. ................... 370/352 |

FOREIGN PATENT DOCUMENTS

| | | |
|---|---|---|
| CN | 1428980 A | 7/2003 |
| WO | WO 03058868 A2 | 7/2003 |

OTHER PUBLICATIONS

Wang Zhengguang, et al., "A Research on the Call Routing of Softswitch," proceeding of ICCT 2003, Apr. 9-11, 2003, Downloaded from IEEE Xplore.

Sun Microsystem Inc., "The Softswitch," Jan. 2, 2002.

Ramnath A. Lakshmi-Ratan, "The Lucent Technologies Softswitch—Realizing the Promise of Convergence," Bell Labs Technical Journal, vol. 4, No. 2, Apr. 1999, pp. 174-195.

* cited by examiner

ROUTE SERVICING DEVICE, METHOD AND SYSTEM APPLYING THE DEVICE

TECHNICAL FIELD

The present invention relates to a route service device, particularly relates to a route service device which is employed under the next generation network system architecture, and a method and a system for realizing call route.

TECHNICAL BACKGROUND

With the development of computer technology and the increasing need for computer inter-networking, the packet switch data network based on IP or ATM is becoming ever strong. In contrast, the conventional PSTN voice network based on TDM doesn't have its service and control separated, so the providing of new services need a longer period, the conventional PSTN voice network seems incapable to meet the requirements of the increasing competitive market. In such condition, the next generation network system architecture with soft switch as its core control equipment emerges. In this architecture, the service and the call control as well as the call and carrying are absolutely separated.

As the core equipment of the next generation network system architecture, the soft switch control device is based on the packet switch data network, and performs functions of controlling call process, adapting access protocol, providing service interface, networking other networks (including PSTN, GSM, other soft switch control devices, etc.), and applying supporting system, etc., it employs standard protocol and open system architecture of application programming interface, which is convenient for a third party to participate in the employment and development, and makes the deployment of new services more quickly.

When a user U1 on a soft switch control device S1 calls a user U2 on another soft switch control device S2, S1 first has to be able to locate U2 on S2 so as to perform the service through S2, therefore, there must be a route relationship (U2, S2) on the S1. With the prevalence of the next generation network system architecture with soft switch as the core control equipment, there will be more and more soft switch control devices. If each soft switch control device is configured with the user route relationships on all of the other soft switch control devices, the route relationship data on each soft switch control device will certainly be huge and complex.

Furthermore, due to the inter-connection of network, the user on one soft switch control device can shake off the limitation of the conventional network to shift from one soft switch control device to another, while the soft switch control device still carries the original user character information. In order to connect with users on other soft switch control devices, the route relationship of other soft switch control devices must also be updated in time. Obviously, the complexity of networking makes the route relationship data of the soft switch control devices becomes difficult to maintain.

SUMMARY OF THE PRESENT INVENTION

The technical problem to be solved by the present invention is to provide a method for realizing call route by employing route service device and a system for realizing this method, which are employed in next generation network with soft switch as core control equipment, and can maintain user route information and realize the call route function by employing the route service device.

In order to solve the above technical problem, the present invention provides a method for realizing call route by employing a route service device, which is employed in next generation network with soft switch as core control equipment, comprising the following steps of:

(a) when a user route changes, a soft switch control device reporting changed route information to a route service device of father node, the information including user character information, user node information and route operation type;

(b) after receiving the report, the route service device looking up a record of a user to be registered in a route information database, and registering the route record of the user in the route information database according to the reported information and the user record;

(c) after finished registering, the route service device broadcasting a changed route information to the father node when the route information of the user changes from the node to the father node;

(d) after receiving the broadcast, the route service device registering and broadcasting the received route information according to the same method of the route service device which received the report;

(e) when calling across domains, a soft switch control device which the calling belongs to initiating inquiry to the route service device of father node;

(f) the route service device which has received the inquiry request looking up route information of a user to be inquired in the route information database, if obtaining a result of the route of the user or the user not existing, performing step (h), otherwise, performing step (g);

(g) said route service device continuing to inquire the node in said route records, if no route record, continuing to inquire the father node, and returning to step (f); and (h) returning inquired result to the node initiating the inquiry, and the node receiving the result continuing to return result to the node inquiring it, until returning to the soft switch control device which initiates the inquiry first.

The above method is characterized in that when performing registration in step (b), if the operation type of the report information corresponds to user moving in, when there is no route record of the user in the route information database, establishing a new record, when the record information of the user is different from the report information, updating the record in conformity with preset condition, otherwise, not performing the operation; if the operation type of the report information corresponds to user moving out, deleting or updating the route record of the user which has the same node information.

The above method is also characterized in that said operation types have two kinds, which are addition and deletion; or have three kinds, which are addition, move-out and account-cancel, and said user character information includes information of specific domain.

In the above method: the user node in said step (a) is the type of soft switch control device, or route service device.

The above method is also characterized in that in said step (c), the route service device finishing the registration also broadcasts the route information to the designated brother node when the route information of the user from the node to the designated brother node changes.

The above method also characterized in that said operation types have two kinds, which are addition and deletion, in said step (f), the route service device executing inquiry performs judgment according to the looking up result in the route information database by following logic:

if the looking up result is that there is no record of user to be inquired, for the node which is at the highest layer, obtaining the looking up result that there is no user, for the node which is not at the highest layer, it is necessary to continue inquiry;

if there is record of user to be inquired in the looking up result, obtaining the inquiring result of the user route when the user node in the route record is the soft switch control device, while continuing inquiry when it is not soft switch control device.

The above method is also characterized in that said operation types have three kinds: addition, move-out, and account-cancel, in said step (f), the route service device inquiring makes the judgment according to the looking up result in the route information database by the following logic:

If the looking up result is that there is no record of user to be inquired, for the node which is at the highest layer, obtaining the looking up result that there is no user, for the node which is not at the highest layer, it is necessary to continue inquiry;

If the looking up result is that there is record of user to be inquired, identifying the operation type in the record:

if the operation type is addition, for that the user node in the record is the type of soft switch control device, obtaining the looking up result of the user route, for that the user node is the type of route service device, it is necessary to continue inquiry;

if the operation type is move-out, for that the node is at the highest layer, obtaining the looking up result that there is no user, for that the node is not at the highest layer, it is necessary to continue inquiry; and if the operation type is account-cancel, obtaining the looking up result that there is no user.

In order to realize the above objects better, the present invention further provides a system for realizing the above method, including several soft switch control devices with users and several route service devices, each of said route service devices and each of said soft switch control device form a node of the system, and the nodes are networked in a layered form, each sub-node has at least a father node, and each father node has at least a sub-node, said soft switch control device is a node at the lowest layer, and said route service device should have a sub-node, in which:

said soft switch device reports the changed route information to the route service device of father node when its user adding or moving out, and initiates route inquiry to the route service device of father node when its user calls across domains;

said route service device is for registering the reported information, and performing the adding, deleting and updating of the route record in the route information database, broadcasting the changed route information to the related node, performing inquiry after receiving the inquiry request, and returning inquiring result to the node initiating the inquiry.

Another technical problem to be solved in the present invention is to provide a route service device employed in the next generation network, which can replace the soft switch device to maintain the user route information, and realizes the call route function.

In order to solve the above technical problem, the present invention further provides a route service device employed in the next generation network, including a route information database module, a route registration module, a route broadcast module and a route inquiry module, wherein:

the route information database module is for storing the route record of user, inputting the user route record, and providing a interface for accessing the user record;

the route registration module is for receiving the route information reported or forwarded by the route broadcast module, looking up the record of user to be registered in the route information database, and registering the route record of the user in the database according to the reported information and the content of user record;

the route broadcast module is for receiving the broadcasted route information, and broadcasting the route information of the user to its father node when the route information of the user from its node to the father node changes;

the route inquiry module is for receiving or sending inquiry request, looking up the record of the user to be inquired in the route information database, returning the inquiring result to the node requesting the inquiry after finding the route of the user, and determining that there is no user or receiving the inquiring result from other nodes, otherwise, continuing inquiring the node in the route record, and if there is no route record, continuing inquiring its father node.

The above device can be used in the system provided by the present invention, but the above device does not limit to the application in the above system.

The above device is further characterized in that said route registration module includes: a report information receiving unit, for receiving route information reported by the soft switch control device, or forwarded by the route broadcast module; a registration access unit, for looking up the route record of the user in the route information database according to the information of the user to be registered in the reported information; a register judgment unit, for establishing a new record if there is no route record of the user when the operation type corresponds to the user moving in, updating the record in the database in conformity with preset condition if the route record information of the user is different from the reported information, otherwise, not performing operation; deleting or updating the route record of the user if the operation type of the report information corresponds to user moving out and the user node in the user record is same to the node in the reported information.

The above device is also characterized in that said route broadcast module includes: a broadcast information receiving unit, for receiving the route information broadcasted by other nodes, forwarding the information to the route registration module; a broadcast judgment unit, for judging whether the route information of the user to be registered from its node to its father node changes, if yes, handing over the route information of the user to the route information broadcast unit; a route information broadcast unit, for broadcasting the changed route information to the father node.

The above device is also characterized in that said route inquiry module includes: an inquiry interface unit, for receiving inquiring request from other nodes or sending inquiry request to other nodes, and returning the inquiring result of the module to the node requesting the inquiry or forwarding the inquiring result receiving from other nodes; an inquiry access unit, for looking up in the route information database according to the character information of the user to be looked up in the inquiry request, and reporting the inquiring result to the inquiry judgment unit; an inquiry judgment unit, for judging whether the inquiring result is that the user route does not exist or the user does not exist according to the looking up result, or it is necessary to send inquiring request to related node, and to indicate the inquiry interface unit to perform corresponding operation.

The above device is also characterized in that when a node A sends route inquiry to a node B, and when node B finds that this route does not exist in its route information database, the node B can return an information of jumping to the next inquiry node C to node A, so that the node A continues to initiate route inquiry to the node C.

The above device is also characterized in that said route broadcast module broadcasts the route information to designated brother node when the route information of the user from the node to the designated brother node changes.

The above device is also characterized in that the operation types of said route record have two kinds: addition and deletion, said inquiry judgment unit makes judgment according to the looking up result in the route information database by the following logic:

if the looking up result is that there is no record of the user to be looked up, for the node that is at the highest layer, determining that the user does not exist, if the node is not at the highest layer, continuing inquiry;

if the looking up result is that there is record of user to be looked up, when the user node in the route record is soft switch control device, obtaining the user route, when the user node is not soft switch device, continuing inquiring the user node in the record.

The above device is also characterized in that the operation types of the route record have three kinds: addition, move-out and account-cancel, said inquiry judgment unit performs judgment according to the looking up result in the route information database by the following logic:

if the looking up result is that there is no record of user to be looked up, for the node that is at the highest layer, determining that the user does not exist; if the node is not at the highest layer, continuing inquiry, or returning father node to the inquiry node as the next jump inquiry node, so as to instruct the inquiry node to perform route inquiry with the next jump inquiry node;

if the looking up result is that there is record of user to be looked up in the looking up result, discerning the operation type in the record again:

when the operation type is addition, for the user node in record being the soft switch control device, obtaining the user route; for the user node being the route service device, continuing inquiring the user node, or returning the user node to the inquiry node as the next jump inquiry node, so as to instruct the inquiry node to perform route inquiry with the next jump inquiry node;

when the operation type is moving out, for the node that is at the highest layer, determining that the user does not exist, for the node that is not at the highest layer, continuing inquiring its father node, or returning the father node to the inquiry node as the next jump inquiring node, so as to instruct the inquiry node to perform the route inquiry with the next jump inquiry node; and when the operation type is account-cancel, determining that the user does not exist.

From above we can see that, by employing the present invention, the changes of the user route information of one soft switch control device are reflected on the route service device, so that when other soft switch control devices call the user, they can obtain the soft switch control device which the user belongs to by inquiring the route service device. Furthermore, the route service device will make the networking form of soft switch control devices more flexible. Any soft switch control device can make their user route shared in the whole network as long as they are connected into the network by the route service device, without manually configuring the route information from one soft switch control device to another. Therefore, the present invention frees the soft switch control device from the complicated route information maintenance, so that the soft switch control device can be wholly absorbed in providing service while doesn't need to manage the route, and also provides a scheme of large scale networking at telecommunication level for soft switch device.

PREFERRED EMBODIMENTS OF THE PRESENT INVENTION

The route in the present invention refers to the user character information and landing node information. The user character information refers to the unique information in the whole network for identifying and locating the user, such as telephone number, uniform resource location identification URI; the landing node information is the information of the soft switch device for user landing, such as IP address.

The related information of user route is reported to the route service device by the soft switch device, and the route service device registers the information in the database, and stores the user route record, and broadcasts it to other route service devices when necessary. The information database on the soft switch control device has the information of local user, the call in domain can be connected by the local device, when calling across domains, the soft switch control device where the call locates has to inquire the route service device for the route of the user being called, and finish the connection process according to the landing node in the route.

Next, the technical content and effect of the present invention will be described in detail according to the specific embodiments in connection with the drawings. Each embodiment will be described in four aspects: system, method, route service device being used and the specific route maintenance and call route.

The First Embodiment

Figure 1:
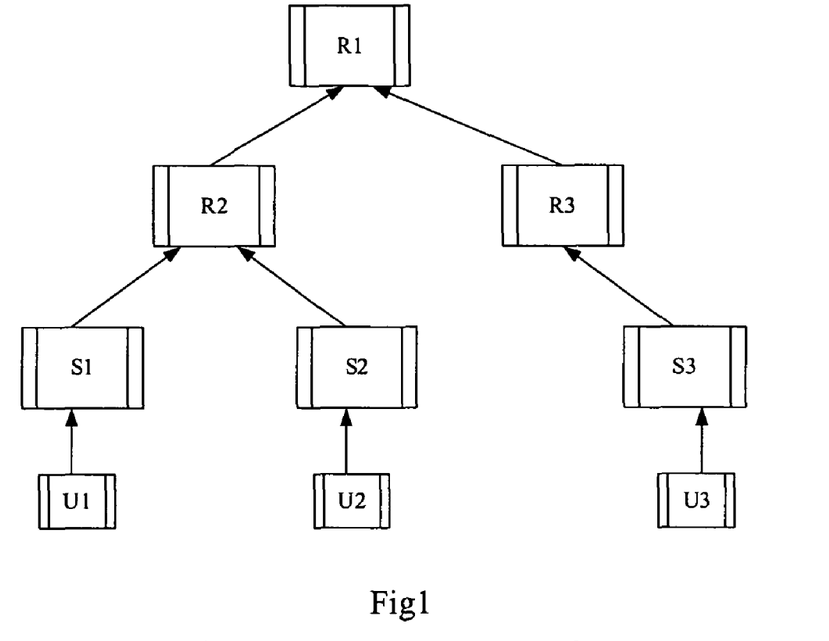
FIG. 1 is a networking schematic view for route service device according to the embodiments of the present invention.

FIG. 1 is the schematic view for soft switch control device networking into a big network by employing route service device according to the present embodiment, which uses layered network form. In which, soft switch control device refers to S, route service device refers to R, user terminal refers to U. U1, U2 and U3 are the users of S1, S2, S3 respectively. The route service device R2 is connected with soft switch control device S1 and S2, R3 is connected with S3, and R1 is connected with R2 and R3 respectively.

In the present invention, each soft switch device and each route service device make up of a node, and it is a layered relationship between nodes, each sub-node has one or more father nodes, while each father node also has one or more sub-nodes, the soft switch control devices are always located at the lowest layer, equivalent to leaf nodes, while the father nodes must be route service devices, the route service devices should have sub-nodes, whose type may have two kinds, that is, soft switch control device and route service device, for example, R1 is the father nodes of R2 and R3, correspondingly, R2 and R3 are the sub-nodes of R1, R2 and R3 are brother nodes. In the system, the node at the highest layer needs to store the route record of all the users in the network, the route service device R1 at the highest layer should be comprehended as the logic device, a route device same to the R1 in FIG. 1 can be realized by employing multiple actual route service devices.

The method of the present invention for realizing call route is composed of operations of report, registration and inquiry. In this embodiment, the soft switch control devices report the user route information to the route service devices by employing LDAP (Lightweight Directory Access Protocol), the route service devices report to each other by employing TRIP (Telephony Routing over IP) protocol, and the route inquiry between nodes is accomplished by employing LDAP protocol. LDAP is a light index access protocol, providing information access service. TRIP (Telephony Routing over IP) is a telephony route protocol on the IP network. These two kinds of protocols can be referred to the description of related document in RFC. In this article, in order to distinguish the above reports, the report from the soft switch control device to the route service device is called up-report, the report between route service devices is called broadcast.

In this invention, route information and route record both include user character information, user node information and route operation type, wherein, the user node information can be defined as the information of the user landing node, or includes the information of the sub-node of the user (R or S), the operation type can be generally divided into two kinds: soft switch control device corresponding to the join-in of user, soft switch control device corresponding to the move-out of user (such as move and account-cancel, or delete), but the specific categories may be different, for example, the operation type can be set as addition when user joining, the operation type can be set as deletion when user moving out, they can also be further divided into move-out and account-cancel, the operation type in the record may be connotative.

Figure 2:
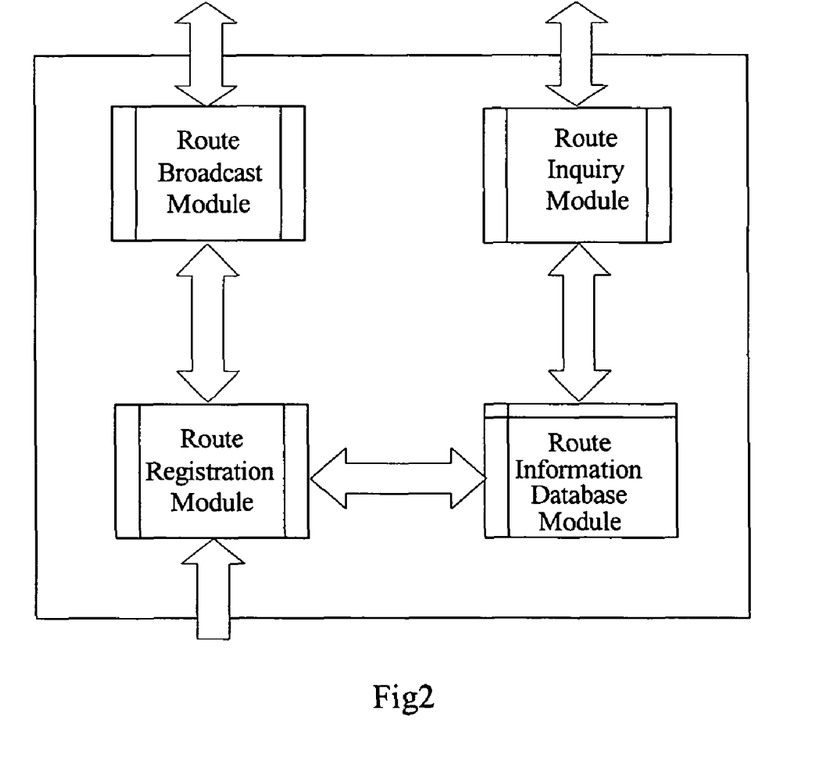
FIG. 2 is a function block of route service device for providing route service according to the embodiments of the present invention.
Figure 3:
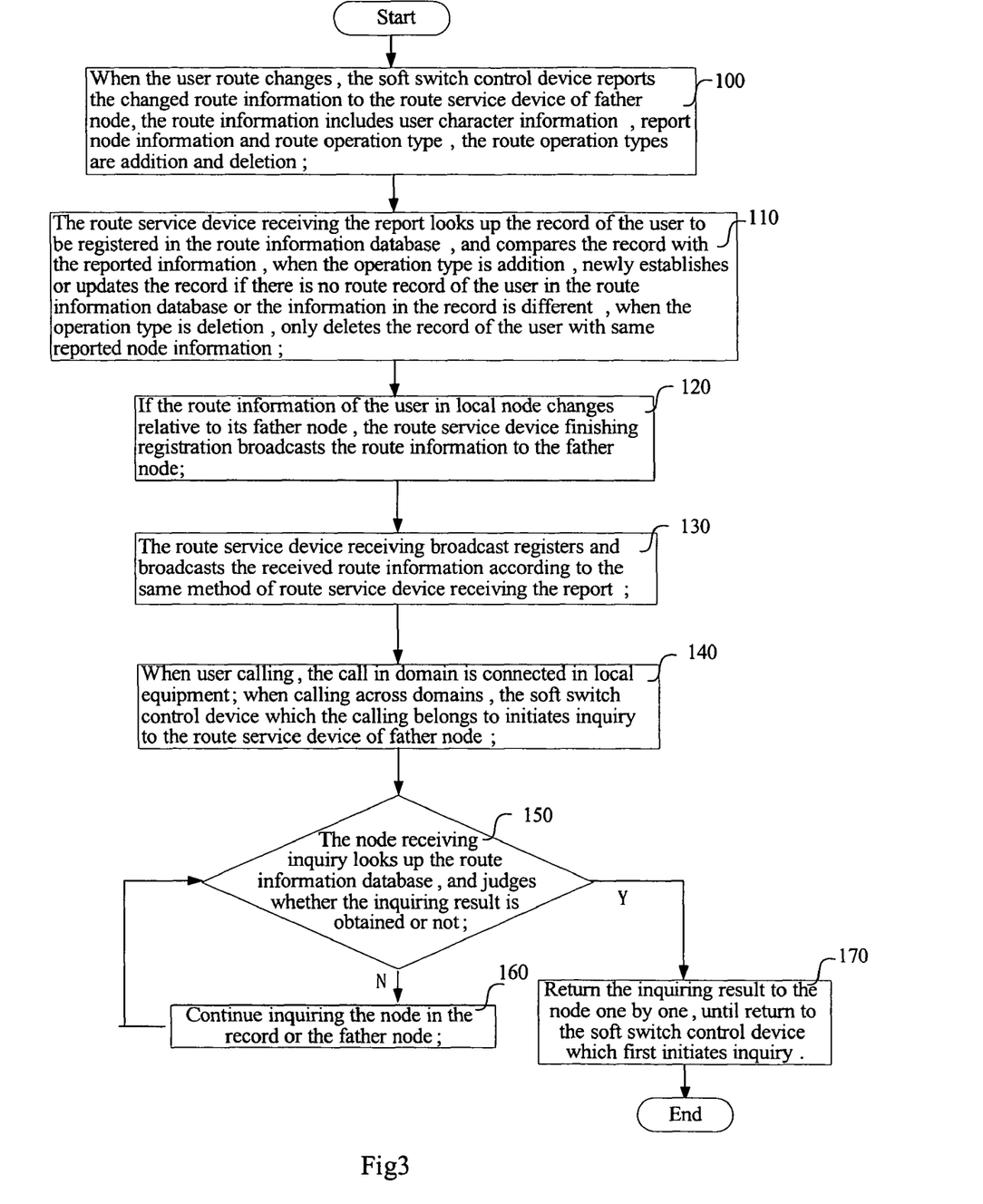
FIG. 3 is a flowchart for realizing call route method according to the first embodiment of the present invention.
Figure 4:
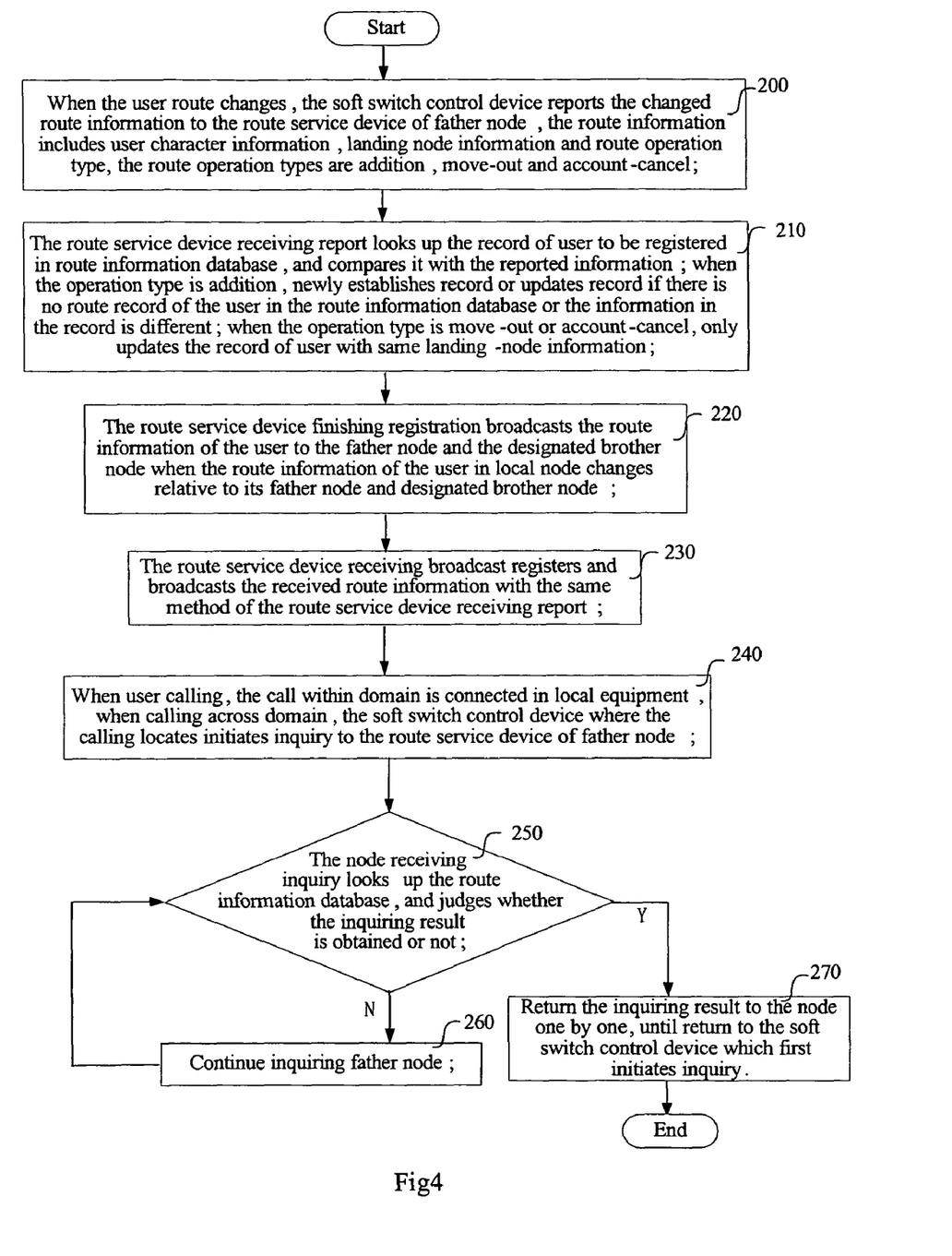
FIG. 4 is a flowchart for realizing call route method according to the second embodiment of the present invention.

The method of this embodiment includes the following steps of:

Step 100, when the user route changes, the soft switch control device reporting the changed route information to the route service device of father node, including the user character information, the report node information and the route operation type, in which, the report node information refers to the node reporting route information, and may be S or R; the route operation type has two kinds, which are addition and deletion, when a user joining the soft switch device, the operation type of the reported route information is addition, when a user moving out of a soft switch device due to the move or account-cancel, the operation type of the reported route information is deletion;

Step 110, the route service device receiving the report looking up the record of user to be registered in the route information database, and comparing the record with the reported information, when the operation type is addition, if there is no route record of the user in the route information database, establishing a new route record; if the route record is different from the information in the record, performing corresponding operations according to the setting: if update is allowed, updating the record, otherwise, returning error directly without any operation on route information database, for example, U1 in FIG. 2 is connected to S1 first, at this time, there is a route record (U1,S2) in route information database of R2, then shifting to S2, supposing that S2 reports the route information (U1, S2, addition type) to R2 prior to S1, at this time, R2 has to decide whether to permit the update of this route information according to policy, if permit, updating the record (U1,S1) to (U1,S2), otherwise, returning error information to S2 directly without any operation on the route information database; when the operation type of the reported information is deletion, only deleting the record of the user with the same reported node information, otherwise, not performing any operation, in which, this route record, same as the route information, includes the user character information, the reported node information and the operation type information, in this embodiment, because only the operation type of new added record is stored, the information of operation type can be omitted in the record;

Step 120, when the route information of the user from the node to its father node changes, the route service device accomplishing the registration broadcasting the route information to the father node, normally, this operation is performed after the registration, in which, because the node in the route service information is report node which is to change the node in the route record into the local node, and then compare the local node with the original record of the user so as to judge whether there is a change, so the information has to be broadcasted to the father node only when newly establishing or deleting the route record, for example, U1 in FIG. 1 moves to S2, supposing that S2 reports information (U1, S2, addition type) to R2 prior to S1, the original record (U1, S1) in R2 is updated to (U1, S2), but for R1, the route information of the user is still (U1, R2, addition type), so it is not necessary to report to R1, whereby reducing the quantity of broadcast;

Step 130, the route service device receiving the broadcast registering and broadcasting the received route information according to the same method of route service device receiving the report, wherein, the sub-node only broadcasts to the father node, while the node at the highest layer does not need to broadcast;

Step 140, when user calling, connecting the call in domain in local equipment; when calling across domains, the soft switch control device where the calling locates initiating inquiry to the route service device of father node.

Step 150, the route service device receiving the inquiry request looking up the record of the user to be looked up in the route information database; if the node in the user record is soft switch control device, obtaining the inquiring result of user route; if there is no record of the user and the local node is at the highest layer, obtaining the inquiring result that there is no user, when obtaining the inquiring result, performing step 170, otherwise, performing step 160;

Step 160, if the node in the user record is route service device, continuing inquiring the node in the record, and returning to step 150, if there is no record of the user and the local node is not at the highest layer, continuing inquiring the father node, and returning to step 150;

Step 170, returning the inquiring result to the inquiring node, and the node receiving the result continuing to return result to the node which inquires it, until returning to the soft switch control device which first initiates the inquiry, and ending.

In order to realize the above functions, as shown in FIG. 2, the route service device of the present invention includes the following modules:

route information database module, comprising a route record storage unit, for storing the route record of the user; a route record write-in unit, for writing in the user route record; a record access interface unit, for providing the interface to access the user record; and it can also including units for performing other operations on the route database, in this embodiment, the route service device stores the user route information of all the soft switch devices at the low layer of the device;

route registration module, comprising a report information receiving unit, for receiving route information reported by soft switch control device or forwarded by the route broadcast module; a registration access unit, for looking up the route record of the user in the route information database according to the information of the user to be registered in the reported information; a registration judgment unit, for establishing a new record if the route record of the user does not exist when the operation type is addition, or for updating the record in the database in conformity with preset conditions if the information in the user record is different from the reported information, otherwise, not performing operation; when the operation type of reported information is deletion and the report node in the user record is same as the node in the reported information, deleting the record of the user in database, with the special operation performed by the route record write-in unit;

route broadcast module, comprising a broadcast information receiving unit, for receiving route information broadcasted from other nodes, and handing it over to the route registration module for processing; a broadcast judgment unit, for judging whether the route information of registration user from local node to its father node changes, in this embodiment, if the route record is newly established or deleted, there will be changes, if yes, handing over the user route information to the route information broadcast unit; a route information broadcast unit, for broadcasting the changed route information to the father node (if there is a father node);

route inquiring module, comprising inquiry interface unit, for receiving inquiry request from other nodes or sending inquiry request to other nodes, and returning the inquiring result of the module to the inquiry node or forwarding the received inquiring result from other nodes; an inquiry access unit, for looking up in the route information database according to the user character information to be looked up in the inquiry request, and reporting the result to the inquiry judgment unit; an inquire judgment unit, for judging whether to obtain the user route according to the inquiring result, and determining whether the user does not exist, or it has to send inquiry request to father node or the node in the route record, and handing it to the inquiry interface unit for corresponding operation.

In this embodiment, the inquiry judgment unit makes judgment according to the following logic:

if there is record of user to be looked up in the inquiring result, judging whether the report node in the record is soft switch device, if yes, returning to the user route, otherwise, continuing inquiring the report node (R);

if there is no record of user to be looked up in the inquiring result, and if the local node is at the highest layer, returning the result that the user does not exist, otherwise, continuing inquiring the father node.

When networking this embodiment, S1, S2 should register the user route information in domain with R2, and S3 should register with R3, R2 and R3 broadcast the user route information in database to R1. Take the example of U1 joining S1, the process for route registration is as follows:

S1 reporting a route information (U1, S1, addition type) to R2 through LDAP protocol;

if the route registration module of R2 can not find the record of U1 in route information database, establishing a record (U1, S1) in the route information database;

the route broadcast module of R2 finds that the node having to be broadcasted is R1, judging that the route information of the user changes relative to R1, then broadcasting the information (U1, U2, addition type) to R1 through TRIP protocol;

after receiving the message, the route broadcast module of R1 establishing the record of (U1, R2) in the route information database through the route registration module.

By the same token, the route information of U2 is reported to R2 and R1, while the route information of U3 is reported to R3 and R1. If the soft switch control device to be networked has been used, at the beginning of system start-up, the route service device should actively request all of the soft switch device for the route information.

When U1 is cancelled from S1, S1 reports to R2, and deletes the record of (U1, S1) from R2, R2 broadcasts to R1, and deletes the record of (U1, R2) from R1.

When U1 moves from S1 to S2, if S1 first reports to R2 to delete the route information of U1, after R2 broadcasting to R1, the records of U1 in R2 and R1 are deleted, S2 reports the route information of newly added U1 to R2, R2 establishes record of (U1, U2), after R2 broadcasting to R1, R1 newly establishes record of (U1, R2). If S2 first reports the route information of newly added U1, R2 updates the record of (U1, S1) to (U2, S2), for R1, the route information of U1 has no change, still being (U1, R2, addition type), therefore R2 does not need to broadcast to R1, and when S1 broadcasts to R2 to delete the route information of U1 again, the report node of U1 record in R2 is S2, which is different from node S1 in reported information, thereby not operating any operation.

After finishing the report and registration, each soft switch control device is able to find users of other soft switch control devices in network by the route service device, and establish service relationship with them. In FIG. 1, when U1 calling U2, the calling route is as follows:

U1 dials U2, S1 receives the calling request;

S1 can not get the route of U2 number, then it initiates inquiry for (U2) route to R2;

R2 inquires its route information database, obtaining such result as (U2, S2), and returning the result to S1;

after S1 receiving the route result (U2, S2), it initiates a call to S2, and S1 and S2 establish call channel for U1 and U2 by call signaling.

This call can be achieved only by one route service device.

When U3 dials U1, the route of this call is more complex, with the whole process as follows:

U3 dials U1, S3 receives the call request;

S3 can not get the route of U1 number, then it initiates inquiry for (U1) route to R3;

R3 can not find the route of (U1) by route inquiry service, continuing initiating inquiry for (U1) route to R1;

after R1 receiving the inquiry request from R3, it finds (U1, R2) by route inquiry service, because R2 is route service device, R1 continues initiating inquiry request for (U1) route to R2;

after R2 receiving the inquiry request from R1, it finds (U1, S1) through route inquiry service, because S1 is soft switch control device, R2 returns inquiring result (U1, S1) to R1;

after R1 receiving the result from R2, it returns result (U1, S1) to R3;

R3 returns the result (U1, S1) to S3;

after S3 receiving the route result (U1, S1), it initiates call to S1, S3 and S1 establish call channel for U1 and U3 by signaling.

Other call processes are similar.

Further, in the system of the present invention, the security of the telecommunication between each devices can be ensured by identify authentication and encryption.

Second Embodiment

The networking method (FIG. 1) and the protocol employed in reporting inquiry of this embodiment are same as that of the first embodiment. But in the route information, the landing node information replaces the report node information, the route operation type is divided into three types: addition, move-out, and account-cancel; when performing route broadcast, the route service device broadcasts the changed route information not only to the father node, but also to the designated brother node; and the method for route report, registration and inquiry operation also has some corresponding changes.

The method in this embodiment for realizing route includes the following steps of:

Step 200, when the route of the user changes, the soft switch control device reporting the changed route information to the route service device of father node, the route information including user character information, landing node information and route operation type, in which, the route operation type is divided into addition, move-out and account-cancel, when a user joining the soft switch device, the operation type of the reported route information is addition; when a user moves from one soft switch device to another soft switch device, the operation type of the reported route information is move-out, which indicates that the user still exists, only with its location changed; when a user is cancelled from a soft switch device, the operation type of the reported route information is account-cancel, which indicates that the user does not exist;

Step 210, the route service device receiving report looking up the record of user to be registered in the route information database, and comparing the record with the reported information; when the operation type is addition, if there is no route record of the user in the route information database, establishing a new record; if the information in record is different from the reported information, updating the record when meeting the preset condition, otherwise, not performing any operation; if the operation type is move-out or account-cancel, only updating the record of user with the same landing-node information, otherwise, not performing any operation; the operation of this embodiment is related with the inquiry and judgment, therefore, the information of operation type can not be omitted in the record;

Step 220, the route service device accomplishing registration broadcasting the route information of the user to the father node and the designated brother node when the route information of the user in local node changes relative to its father node and designated brother node, in this embodiment, because the node in the route information is landing node, it is identical for sub-node, designated brother node or father node that whether the route information changes or not.

The route service device R2 can design whether to broadcast the changes of route information to the route service device R3 of the brother node, so that the networking becomes more flexible, and the network can have a better backup system. Supposing R2, R3 in this embodiment are mutual designated brother nodes, when R3 accessing the user route of R2, R3 only needs to inquire the route information database module of its own, without through the help of father node; it is same for R2 accessing the user route of R3, therefore speeding up the access.

Step 230, the route service device receiving the broadcast registering and broadcasting the received route information by the same method of route service device receiving report;

Step 240, when user calling, connecting the call within domain in local device, when calling across domains, the soft switch control device where the calling locates initiating inquiry to the route service device of father node;

Step 250, the route service device receiving inquiry request looking up record of user to be looked up in the route information database, if finding the record that the user is addition type, obtaining the inquiring result of the user route; if finding the record that the user is account-cancel type, or that the local node is at the highest layer, and not finding the record of the user or finding the record of move-out type, obtaining the inquiring result that the user does not exist, when obtaining the inquiring result, performing step 270, otherwise, performing step 260;

Step 260, when the local node is not at the highest layer, and not finding the user record or finding the record of move-out type, continuing inquiring its father node, and returning to step 250;

Step 270, returning the inquiring result to the inquiry node, and the node receiving the result continuing to return result to the node which inquires it, until returning to the soft switch control device first initiating inquiry, and ending.

In this embodiment, the user character information should include the information of special domain, so as to prevent from the condition that the user joining from another domain employs the same character information with the account-cancel user. Furthermore, the actual inquiry process during calling is different due to different broadcasting forms.

The route service device of this embodiment includes the following modules:

route information database module, which has the same units and functions as the first embodiment, with differences due to the different broadcasting form that the route service device stores the user route information of all the soft switch devices below the layer of local node and designated brother node;

route registration module, wherein the units and the function of the report information receiving unit and registration access unit are same as the first embodiment, while the registration judgment unit is for establishing record newly if there is no route record of the user when the operation type is addition, and for updating the record in database when meeting the preset condition if the information in user record is different from the reported information, otherwise, not performing any operation; if the operation type of reported information is move-out or account-cancel, and the landing-node in user record and node in report information is same, updating the operation type of the record in database;

route broadcast module, wherein the units and the function of the broadcast information receiving unit are same as the first embodiment, while the broadcast unit is for judging whether the route information of the registered user in local changes relative to its father node and designated brother node, if changes, handing the user route information to the route information broadcast unit; the route information broadcast unit is for broadcasting the changed route information to father node (if existing) and designated brother node;

route inquiry module, wherein the units and the function of inquiry interface unit and inquiry access unit are same as the first embodiment, the inquiry judgment unit judges whether to return inquiring result or to continue initiating inquiry request to other nodes according to inquiring result by the following logic:

if there is no record of user to be looked up in the result, and if the node is at the highest layer, returning the result of no user existing, otherwise, continuing inquiring the father node;

if there is record of user to be looked up in the result, performing the following operations according to different operation types:

when the operation type is addition, because there is information of user landing-node in the record, returning the user route;

when the operation type is move-out, if the node is at the highest layer, returning the result that there is no user, otherwise, continuing inquiring the father node; and when the operation type is account-cancel, returning the result that the user does not exist.

In this embodiment, when U1 joining in S1, S1 reports the route information of (U1, S1, addition type) to R2, R2 establishes the record of (U1, S1, addition type) in the route information database, and broadcasts to R1 and R3, thereby newly adding the record of (U1, S1, addition type) to R1 and R3;

When U1 is cancelled from S1, S1 reports to S2, and updates the record of (U1, S1, addition) to (U1, S1, account-cancel type) in R2, and broadcasts to R1 and R3, and updates the record of (U1, S1, addition type) in R1 and R3 to (U1, S1, account-cancel type).

When U1 moves from S1 to S3, S1 first reports move-out information to R2, R2 updates the record of (U1, S1, addition type) to (U1, S1, move-out type), and broadcast to R1 and R3, and also update the record of (U1, S1, addition type) in R1 and R3 to (U1, S1, move-out type), then S3 reports new addition information of U1 in R2, because the record information of U1 in R3 is different from the reported information, R3 updates the record of (U1, S1, move-out type) to (U1, S3, addition type), and broadcasts to R1 and R2, in the same way, R1 and R2 will update the record (U1, S1, move-out type) into (U1, S3, addition type) again; if S3 first reports the new addition information to R3, R3 newly establishes record (U1, S3, addition type) and broadcasts to R1 and R2, R1 and R2 update the record (U1, S1, addition type) to (U1, S3, addition type), when S1 reports move-out information to R2 again, because in R2 the node S1 in move-out information is different from the node in record (U1, S3, addition type), no operation will be performed, and because the route information of U1 in R2 has no change, R2 does not broadcast to R1.

After networking according to FIG. 1, U3 dials U1 according to the following processes:

U3 dialing U1, S3 receiving the call request;

when R3 can not find the route of U1 number, initiating (U1) route inquiry to R3;

after R3 receiving the inquiry request from S3, it finding the record of (U1, S1, addition type) through the route inquiry service, because S1 is soft switch device, returning inquiry result (U1, S1) to S3;

after S3 receiving the route result (U1, S1), it initiating a call to S1, S3 and S1 establishing a call channel for U1 and U3 by signaling.

It can be seen from above that, by employing the broadcast form of the present invention and employing the landing node information in the route information, the process of call route is simplified, but the broadcast quantity and the load of route service device are somewhat increased.

After U1 is cancelled from R2, when U2 dials U1, S2 inquires R2, R2 finds the record of (U1, S1, account-cancel type), and returns the result that the user does not exist to S2 directly, thus the times of inquiry is reduce, and the inquiry process is simplified.

Based on the above embodiments, various combinations and changes can be performed, for example, as for whether the user node information uses the landing node information or the report node information, whether the route service device to be broadcasted to designated brother node, and whether the operation type is divided into addition and deletion or divided into addition, move-out and account-cancel, these selections can be combined into many forms freely; correspondingly, the logic for judging whether the user route or the user exists or not, and which node to be inquired will also be different, but this can be definitely realized according to the disclosure of the present invention.

For more example, when user moves out, the above embodiments do not limit the report sequence for moving out and moving into soft switch control device, but this can also be preset, for example, presetting first reporting the soft switch device moving out, then the report information corresponding to move-out type can be registered by the same rule of addition information, that is, if the record in database and the report information is different, updating the record. This preset is related with the rule of route registration.

For more example, when the operation type of the user record of the route service device at the highest layer is move-out or account-cancel, the result returned is that the user does not exist just as when there is no user record, therefore, it is possible to only maintain the record of addition type When using three kinds of operation types;

Furthermore, the route service device of the present invention is not limited to be employed in one certain networking form.

INDUSTRIAL APPLICABILITY

The present invention is employed in the route service device under the next generation network system architecture, in which the soft switch control device is the core equipment in the next generation network system architecture, by employing the present invention, when the user route information of one soft switch control device changes, this change will be reflected onto the route service device, when other soft switch control devices call the user, they can obtain the soft switch control device which the user belongs to by inquiring the route service device. Furthermore, the route service device will make the networking form of the soft switch control device more flexible. Any soft switch control device can make their user routes shared in the whole network as long as they are connected to the network by the route service device, without necessity to manually configure the route information from one soft switch device to another. Therefore, the present invention frees the soft switch control device from the complex route information maintenance, enables the soft switch control device be absorbed in provision of service while without the management of route, and also provides a scheme of large scale networking at telecommunication level for the soft switch control device.

What we claim:

1. A method for implementing call routing, to be used in a next generation network using soft switch control devices as core control devices, comprising implementing the call routing by route service devices, wherein each route service device is only connected with one or more of the soft switch control devices and one or more of other route service devices, wherein the route service devices and the soft switch control devices are networked in a layered way, wherein implementing the call routing by the route service devices comprises the following steps of:

(a) when a route of a user in the next generation network changing, a soft switch control device that the user moves to or moves out of reporting a changed route information related to the user to a route service device at father node of the one of the soft switch control devices, the changed route information including user characteristics information, report node information and route operation type;

(b) the route service device that received the reported changed route information looking up a record of the user to be registered from a route information database, and registering a route record of the user to the route information database according to the reported changed route information and content of the record of the user;

(c) when a route information of the user reflects a change between the route service device that finished registration and its father node, the route service device that finished the registration broadcasting the route information reflecting the change to the route service device at father node of the route service device that finished the registration;

(d) the route service device that received the broadcasted route information registering and broadcasting the received broadcasted route information according to the same method as the route service device that received the reported changed route information;

(e) when calling across domains, the soft switch control device to which the calling belongs initiating an inquiry to the route service device at the father node of the soft switch control device to which the calling belongs;

(f) the route service device that received a request of the inquiry looking up a route record of the user to be looked up from the route information database, if an inquiring result of the route of the user or an inquiring result indicates that the user does not exist is obtained, performing step (h), otherwise, performing step (g);

(g) the route service device that received the request of the inquiry continuing the inquiry to a node in said route record, if there is no route record, continuing an inquiry to its father node, and returning to step (f); and (h) the route service device that received the request of the inquiry returning the inquiring result to the node that initiated the inquiry, any node that receives the inquiring result continuing to return the inquiring result, until returning to the soft switch control device which first initiated the inquiry.

2. The method of claim 1, wherein when performing registration in step (b), if the operation type of the reported changed route information corresponds to the user moving in, when there is no route record of the user in the route information database, establish a new record, when the record information of the user is different from the reported changed route information, update the record in conformity with pre-set condition, otherwise, not perform the operation; if the operation type of the reported changed route information corresponds to the user moving out, delete or update the route record of the user which has the same node information.

3. The method of claim 1, wherein operation type have two kinds, which are addition and deletion; or have three kinds, which are addition, move-out and account-cancel, and said user characteristics information includes information of specific domain.

4. The method of claim 1, wherein the report node in said step (a) is a type of the soft switch control device, or a type of the route service device.

5. The method of claim 1, wherein in said step (c), when the route information of the user reflects a change between a local node and a designated brother node, the route service device that finished the registration also broadcasts the route information reflecting the change to the designated brother node.

6. The method of claim 1, wherein operation type have two kinds, which are addition and deletion, in said step (f), the route service device performing the inquiry makes judgment according to a looking up result in the route information database by following logic:

if the looking up result is that there is no record of user to be inquired, for a local node which is at a highest layer, obtaining the looking up result that there is no user, for a local node which is not at the highest layer, continuing an inquiry; and if there is record of the user to be inquired in the looking up result, when the report node in the route record is the soft switch control device, obtaining the inquiring result of the route of the user; when the report node in the route record is not the soft switch control device, continuing the inquiry.

7. The method of claim 1, wherein operation type have three kinds: addition, move-out and account-cancel, in said step (f), the route service device performing inquiry makes judgment according to the looking up result in the route information database by the following logic:

if the looking up result is that there is no record of user to be inquired, for a local node which is at a highest layer, obtaining a looking up result indicating that there is no user, for a local node which is not at the highest layer, continuing an inquiry;

if the looking up result is that there is record of user to be inquired, identifying the operation type in the record:

when the operation type is the addition, if the report node in the record is a type of soft switch control device, obtaining the looking up result of the route of the user; if the report node is a type of route service device, continuing an inquiry;

when the operation type is the move-out, if the local node is at a highest layer, obtaining the looking up result indicating that there is no user; if the local node is not at a highest layer, continuing an inquiry; and when the operation type is the account-cancel, obtaining a looking up result indicating that there is no user.

8. A system for implementing call routing, to be used in a next generation network using soft switch control devices as core control devices, comprising a plurality of soft switch control devices with users, wherein, the system further comprises a plurality of route service devices, wherein each route service device is only connected with one or more of the soft switch control devices and one or more of other route service devices, each of said route service devices and each of said soft switch control devices form nodes of the system, and the nodes are networked in a layered form, each sub-node has at least a father node, and each father node has at least a sub-node, said soft switch control devices are nodes at a lowest layer, and said route service devices have sub-nodes, wherein:

said soft switch devices are configured for reporting changed route information to the route service device at the father node when a route of its user is changed, and initiating a route inquiry to the route service device at the father node when its user calls across domains; and said route service devices are configured for registering the reported information, performing adding, deleting and updating of route record in a route information database of the user; broadcasting the changed route information to related nodes, performing inquiry after receiving an inquiry request, and returning inquiring result to the node initiating the inquiry.

9. The system of claim 8, wherein said route service device comprises a route information database module, a route registration module, a route broadcast module and a route inquiry module, wherein the route information database module is configured for storing the route record of a user, inputting the route record of the user, and providing an interface for accessing the route record wherein the route registration module is configured for receiving a route information reported or forwarded by the route broadcast module, looking up a record of a user to be registered from the route information database, and registering the route record of the user to the route information database according to the reported route information and content of the user record;

wherein the route broadcast module is configured for receiving a broadcasted route information, and when a route information of a user reflects a change between a local node and its father node, or between the local node and both the father node and a designated brother node, broadcasting the route information of the user reflecting the change to its father node or both to the father node and the designated brother node; and wherein the route inquiry module is configured for receiving or sending the inquiry request, looking up a record of the user to be inquired from the route information database, returning an inquiring result to a node requesting the inquiry upon finding a route of the user, upon determining that there is no user or upon receiving an inquiring result provided by other nodes, otherwise, continuing an inquiry to the node in the route record, and if there is no route record, then continuing an inquiry to its father node.

10. A route service device to be used in a next generation network using soft switch control devices as core control devices, wherein the route service device is only connected with one or more of the soft switch control devices and one or more of other route service devices, wherein the route service device and the soft switch control devices are networked in a layered way, the route service device comprising:

a route information database module,
a route registration module,
a route broadcast module, and
a route inquiry module, wherein the route information database module is configured for storing a route record of a user, inputting the route record of the user, and providing an interface for accessing the route record of the user;

wherein the route registration module is configured for receiving a route information reported by the soft switch control devices or forwarded by the route broadcast module, looking up a record of the user to be registered from a route information database, and registering the route record of the user to the route information database according to the reported route information and content of the user record;

wherein the route broadcast module is configured for receiving a broadcasted route information and sending the broadcasted route information to the route registration module, and when a route information of the user reflects a change between a local node and its father node, broadcasting the route information of the user reflecting the change to its father node; and wherein the route inquiry module is configured for receiving or sending an inquiry request, looking up the a record of the user to be inquired from the route information database, returning an inquiring result to a node requesting the inquiry upon finding a route of the user, upon determining that there is no user or upon receiving an inquiring result provided by other nodes, otherwise, continuing an inquiry to the node in the route record, and if there is no route record, then continuing an inquiry to its father node.

11. The route service device of claim 10, wherein said route registration module comprises:

a report information receiving unit, for receiving the route information reported by a soft switch control device, or forwarded by the route broadcast module;

a registration access unit, for looking up the route record of the user in the route information database according to the information of the user to be registered in the reported information; and a register judgment unit, for establishing a new record if there is no route record of the user when an operation type corresponds to the user moving in, updating the record in the database in conformity with preset condition if the route record information of the user is different from the reported information, otherwise, not performing operation; deleting or updating the route record of the user if the operation type of the report information corresponds to user moving out and a user node in the user record is same to the node in the reported information.

12. The route service device of claim 10, wherein said route broadcast module comprises:

a broadcast information receiving unit, for receiving the route information broadcasted by other nodes, forwarding the information to the route registration module;

a broadcast judgment unit, for judging whether the a route information of the user to be registered reflects a change between its node and its father node, if yes, handing over the route information of the user to the route information broadcast unit; and a route information broadcast unit, for broadcasting the changed route information to the father node.

13. The route service device of claim 10, wherein said route inquiry module comprises:

an inquiry interface unit, for receiving an inquiring request from the other nodes or sending an inquiry request to the other nodes, and returning the inquiring result of the route inquiry module to the node requesting the inquiry or forwarding the inquiring result received from the other nodes;

an inquiry access unit, for looking up in the route information database according to the characteristic information of the user to be looked up in the inquiry request, and reporting the inquiring result to an inquiry judgment unit; and the inquiry judgment unit, for judging whether the inquiring result is that a user route is obtained or the user does not exist according to a looking up result, or it is necessary to send the inquiry request to related node, and to indicate the inquiry interface unit to perform corresponding operation.

14. The route service device of claim 10, wherein when the route information of the user reflects a change between the local node and a designated brother node, said route broadcast module broadcasts the route information reflecting the change to the designated brother node.

15. The route service device of claim 13, wherein the operation types of said route record have two kinds: addition and deletion, said inquiry judgment unit makes judgment according to the looking up result in the route information database by the following logic:

if the looking up result is that there is no record of the user to be looked up, for a node that is at a highest layer, determining that the user does not exist, for a node that is not at the highest layer, continuing an inquiry; and if the looking up result is that there is record of user to be looked up, when the user node in the route record is a soft switch control device, obtaining the user route, when a user node is not a soft switch device, continuing an inquiry to the user node in the record.

16. The route service device of claim 10, wherein the operation types of the route record have three kinds: addition, move-out and account-cancel, said inquiry judgment unit makes judgment according to the looking up result in the route information database by the following logic:

if the looking up result is that there is no record of user to be looked up, for a node that is at a highest layer, determining that the user does not exist; for a node that is not at the highest layer, continuing an inquiry, or returning the father node to the inquiry node as a next jump inquiry node, so as to instruct the inquiry node to perform route inquiry with the next jump inquiry node;

if the looking up result is that there is record of user to be looked up in the looking up result, discerning the operation type in the record again:

when the operation type is addition, for the user node in record being a soft switch control device, obtaining the user route; for the user node being the route service device, continuing an inquiry to a user node, or returning a user node to the inquiry node as a next jump inquiry node, so as to instruct the inquiry node to perform route inquiry with the next jump inquiry node;

when the operation type is move-out, for a node that is at the highest layer, determining that the user does not exist, for a node that is not at the highest layer, continuing an inquiry to its father node, or returning the father node to the inquiry node as a the next jump inquiry node, so as to instruct the inquiry node to perform the route inquiry with the next jump inquiry node; and when the operation type is account-cancel, determining that the user does not exist.

\* \* \* \* \*